Aug. 14, 1945.   E. W. BOSSI   2,381,968
AIRCRAFT WITH ROTARY BLADE SYSTEMS
Filed April 1, 1943   2 Sheets-Sheet 1

INVENTOR
ENEA WILBUR BOSSI
BY Walter S. Bleston
ATTORNEY

Aug. 14, 1945. E. W. BOSSI 2,381,968
AIRCRAFT WITH ROTARY BLADE SYSTEMS
Filed April 1, 1943 2 Sheets-Sheet 2
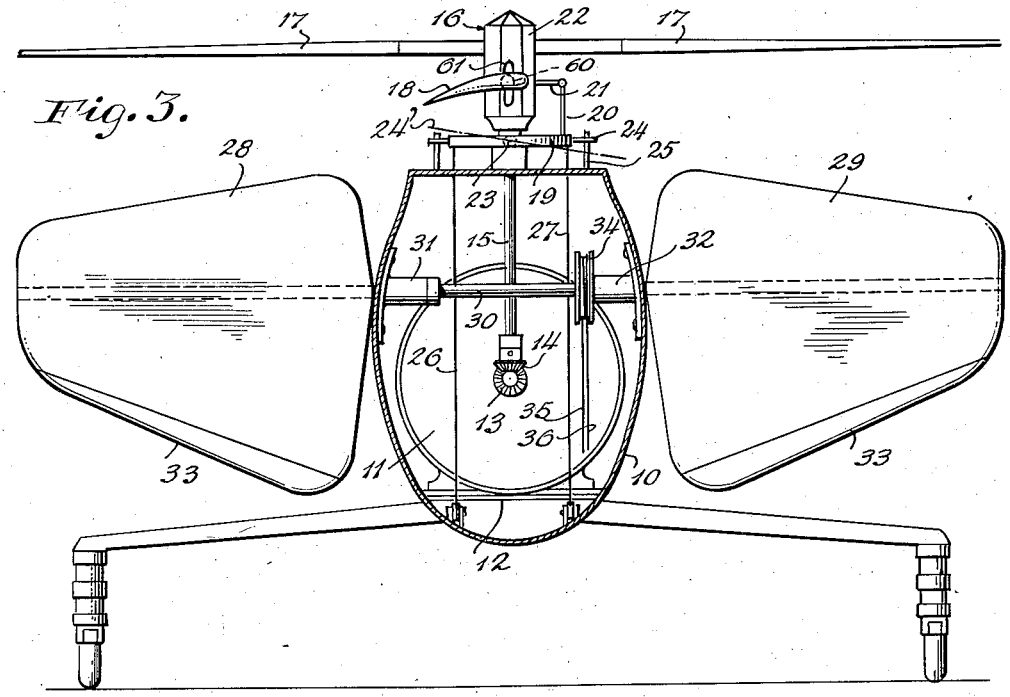
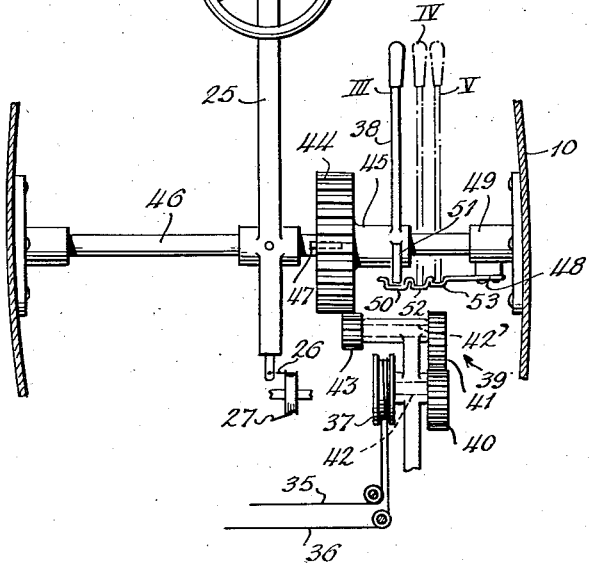
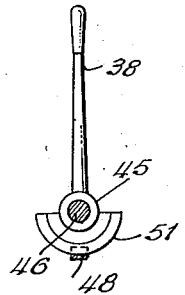
INVENTOR
ENEA WILBUR BOSSI
BY Walter S. Blenton
ATTORNEY Patented Aug. 14, 1945

2,381,968

UNITED STATES PATENT OFFICE 2,381,968

AIRCRAFT WITH A ROTARY BLADE SYSTEM

Enea Wilbur Bossi, New York, N. Y.

Application April 1, 1943, Serial No. 481,389

1 Claim. (Cl. 244—17)

The present invention relates to an aircraft with a system of rotatable blades or wings generating a thrust or thrust component in the direction of the normal axis of the craft, wherein the blade system is or may be power driven, as for instance in a helicopter or in an autogyro with permanently or temporarily operating auxiliary drive of the wing or blade system. In a conventional aircraft of that type translatory power in addition to lifting power can be derived from the rotary system if the plane of rotation of the blades is more or less inclined with respect to the horizontal, but both the lifting power and the translatory power are interdependent. In other words, if the rotor is operating with its highest efficiency, the lifting power will have a certain definite value, if owing to a given inclination of the plane of rotation a desired translatory power is obtained. If it becomes necessary to change the translatory power, the lifting power will also change and vice versa, so that the increase of the one causes a decrease of the other according to a certain invariable law. In many instances, the particular law according to which the lifting power and translatory power are interdependent will not be suited to furnish best results, in other instances the invariability of such law will be considered as disadvantageous.

The present invention contemplates, therefore, the provision of means whereby the pilot of a helicopter or autogyro will be enabled to select, within limits, a desired ratio of lifting power to translatory power, without changing the total thrust of the rotary system. The invention further aims to provide means which tend to cause an increase of the lifting power when the translatory speed is increased, or at least a decrease of the lifting power at a lower rate than occurring in the absence of such means.

The invention essentially consists of wing-like members so turnable about a transverse axis that their angle of incidence in relation to the horizontal may be adjusted between 90° and a low angle value. The invention also consists of means whereby the wing-like members may be adjusted simultaneously with or in response to the adjustment of the rotor for translatory motion of the craft, or, by separate actuation, independent of such rotor control. In order to avoid confusion, I shall denote, hereinafter and in the claims, the elements constituting the rotary system as "blades," and the members turnable about a transverse axis as "wings."

Further objects and details of the invention will be apparent from the description given hereinafter and the accompanying drawings illustrating an embodiment thereof by way of example. In the drawings, Fig. 1 is a diagrammatical side elevation of a helicopter provided with wing-like members according to the invention;

Fig. 3 is a cross-section along line 3—3 of Fig. 1;

Fig. 4 is a diagrammatical view of the controls for adjusting the wing-like members; and Fig. 4a is a side elevation of a part shown in Fig. 4.

Figure 1:
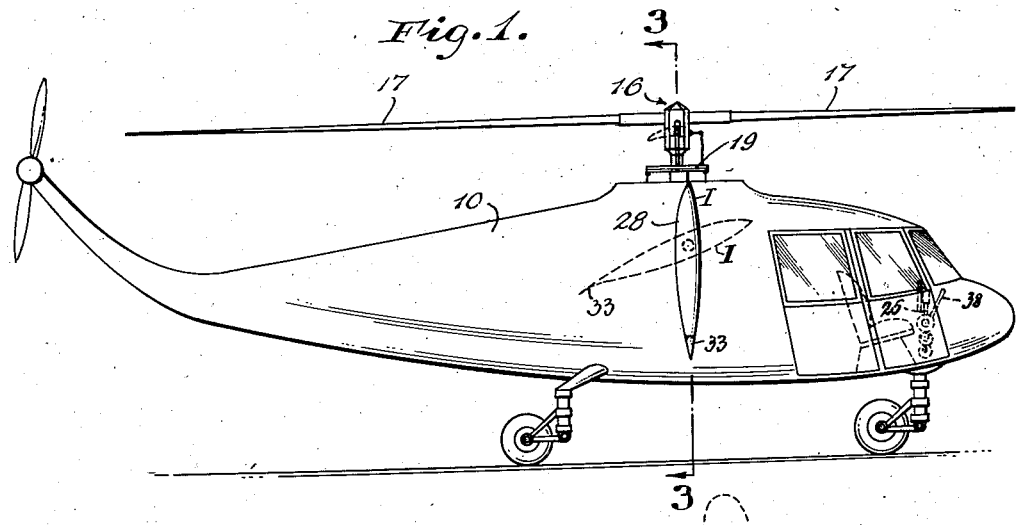

The drawings illustrate a helicopter as e. g. described in the application for U. S. patent Serial No. 444,799, filed May 28, 1942, in the name of Enea Bossi. Interiorly of the fuselage 10, a motor 11 is mounted on a support 12, so as to drive, via a set of bevel gears 13, 14, the vertical shaft 15 of the rotor 16, which comprises two pairs of blades 17 and 18. In the illustrated embodiment the blades are of the "feathering" type, that is to say, the angle of incidence of the blades can be so varied that it increases from a minimum to a maximum during one half of each rotor revolution and then, decreases from the maximum to the minimum during the other half of the revolution. Each pair of blades being so arranged as to be rockable about an axis at right angles to its longitudinal axis and to the axis of rotation, will respond to such feathering by an inclination of its plane of rotation according to the difference between the drag of the semi-circle of the rotor area in which the angle of incidence is decreased owing to the feathering, and the drag of the semi-circle in which the angle of incidence is increased with respect to its mean value. If the feathering is so controlled that the minimum and the maximum angles of incidence occur on that diameter of the rotor which at any time is located in the plane defined by the normal and the longitudinal axes of the craft, the axis of rotation of the inclined rotor will coincide with that plane and the thrust will have components in directions of the normal and of the longitudinal axes of the craft. The feathering can be accomplished by means of a control ring 19 acting e. g. on the pair of blades 18 by means of the link 20 and arm 21 connected to the blade pair 18 interiorly of the rotor head 22. Ring 19 can swivel about an axis 23 parallel to the longitudinal axis of the craft but is prevented from rotation with the rotor by projections 24 in engagement with guides 25 which are solid with the fuselage 10. The lower end of the link 20 is guided by the control ring while the link 20 and arm 21 are free to rotate with the blades 18 about the rotor axis. Thus, if control ring 19 is in an inclined position, such as indicated by dotted line 24', arm 21 will be rocked once up and down during each revolution of the tower, thereby causing the feathering movement of the blades 18. The feathering of the blades 17 can be obtained by another set of members (not shown) similar to the members 20 and 21 in connection with the control ring 19. In order to permit the blades to rock in response to the feathering and, thus to rotate in an inclined plane, roots 60 of the blades are passed through vertical slots 61 of the rotor head 22. The control ring 19 can be inclined by operating the pilot's control stick 25 which is connected to the ring by means of cables 26 and 27. The arrangement is disclosed in full detail in the above-mentioned application Ser. No. 444,799; however, it is to be understood that my invention which now will be described is applicable not only to apparatus of the mentioned type but to any other aircraft with rotary blade system wherein a change of the ratio of translation to lift can be varied under the control of the pilot by varying the plane of blade rotation, as for instance to a craft in which the rotor head is tiltable in respect to rotor shaft axis, or where the longitudinal axis of the craft can be inclined by static or dynamic means.

In addition to the rotor 16, a pair of wings 28 and 29 are secured, laterally of the fuselage 10, to a shaft 30 which traverses the fuselage in front of the rotor shaft 15. Although other relative positions of the shafts 15 and 30 may be chosen with satisfactory result, I prefer the indicated arrangement because the lifting force of the wings in front of the rotor axis which passes through the center of gravity of the craft will cause a torque counteracting the tendency of the rotor to lower the bow of the craft when the rotating blades are set for forward motion. Shaft 30 is carried in bearings 31 and 32 secured to the inner wall of the fuselage 10. The wings 28 and 29 may have any suitable cross-section. In the illustrated embodiment they are shown as having an approximately symmetrical cross-section with a small tail flap 33 which may be automatically adjustable upon turning of the wings. Mechanism for automatic adjustment of the flap, being well known in the art, is not subject matter of the present invention and therefore not shown in the drawings. The wings 28 and 29 are turnable with the shaft 30 and preferably so arranged that the shaft axis coincides with the centers of pressure of the wings.

Figure 2:
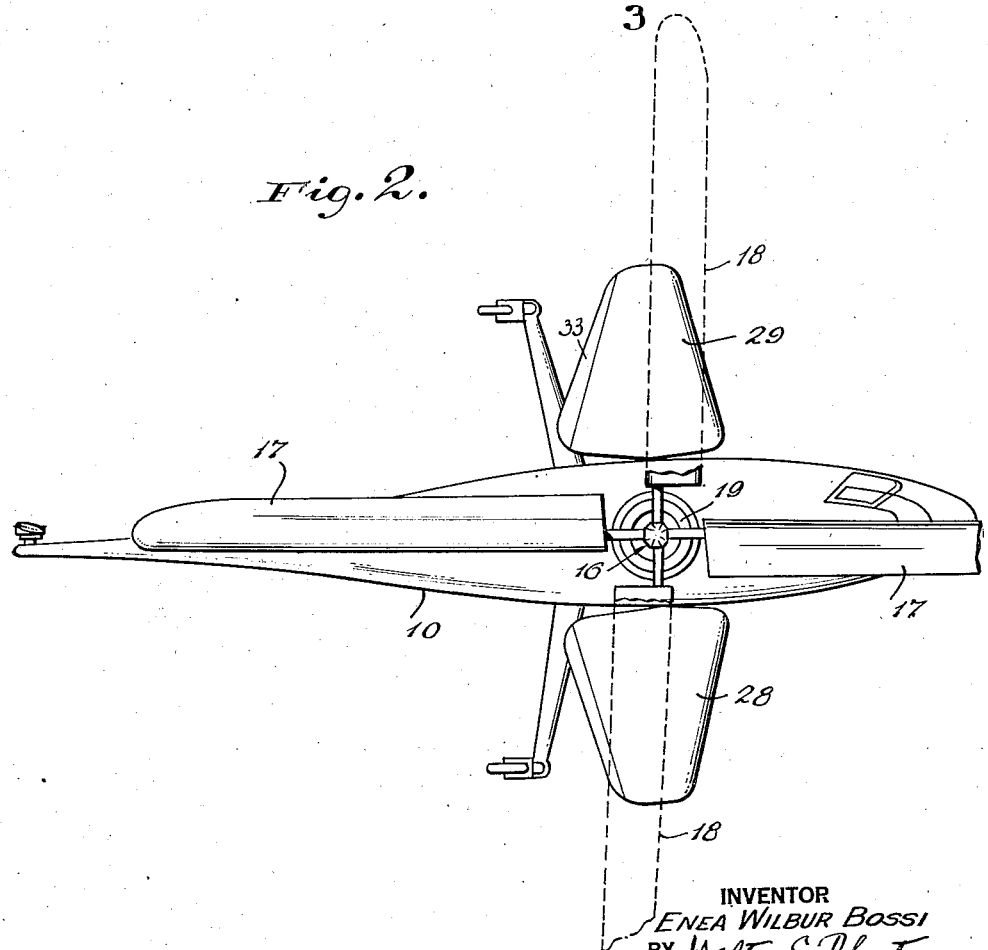
Fig. 2 is a top plan view thereof.

Means are provided to adjust the wings to a position I indicated in Fig. 1 by solid lines and in which the drag of the wings in a vertical direction is a minimum, and to other positions II, one of which is indicated by dotted lines in Fig. 1 and in Fig. 2 and in which the wings will cause a lifting force when the craft is in translatory motion. In the position I the angle of incidence of the wings is approximately 90° in relation to the horizontal. The angle of incidence of the wings in one of the positions II may be selective, approximately between 20° and zero, depending on the translatory speed, on the desired ratio of lifting power to translatory power, on altitude, weight carried, and other factors. In order to adjust the desired wing position a drum or equivalent member 34 is secured to shaft 30, and control cables 35 and 36 are attached to the drum 34 and to a second similar drum 37 shown in Fig. 4 and preferably located in the pilot compartment of the craft. Drum 37 can be turned by a lever 38 and a transmission denoted in general by 39. Now it will be clear that by actuating lever 38 the wings may be turned from their position I into a position suited for the desired wing effect, and back again. However, between that angle of incidence, for instance 20°, which may have to be considered as the maximum angle useful in translatory motion, and the angle of approximately 90° according to the wing position for vertical motion or hovering, there is a range of positions through which the wings should pass rather rapidly during their adjustment, because within that range the wings are apt to create a very appreciable drag when the craft is in translatory motion. For this reason, it is desirable that a relatively small movement of the lever 38 causes a relatively large shift of the wings from 90° towards a lower angle, whereas within the range of the positions useful in translatory motion a relatively larger movement of the lever should cause a relatively smaller change of the angle of incidence. This may be accomplished by the insertion of a cam device in the transmission between lever 38 and shaft 30. In the illustrated embodiment the cam device consists of two elliptical wheels 40 and 41, of which the wheel 40 is secured to the shaft 42 of drum 37 and gear 41 is coupled by shaft 42' to an intermediate gear 43. The latter in turn is in mesh with a gear 44 solid with or fastened to a sleeve 45 to which lever 38 is secured. The sleeve 45 is mounted on shaft 46 to which the control stick 25 is secured. Now it will be clear that owing to the elliptical gears 40 and 41 a movement of the lever 38 will cause drum 37 first to turn a relatively large angle, which decreases the more the lever 38 is displaced from its original position.

In many instances it is desirable to couple the control of the plane of rotation of the blades with the control of the wings. This is accomplished in the present embodiment by key 47 on shaft 46. The key engages the sleeve 45 in the position shown in solid lines and indicated by III. In order to prevent sleeve 45 from shifting axially, a detent spring 48 is secured to the bearing 49 of shaft 46. Spring 48 is notched at 50 so as to receive therein a sector 51 (see Fig. 4a) integral with lever 38. In other instances, however, it is preferable to have the choice between independent control of the wings on the one hand and automatic adjustment of their angle of incidence, depending on the adjustment of the rotor blades on the other hand. In order to make selective operation possible sleeve 45 with lever 38 and gear 44 is shiftable into the position indicated by IV, in which the key 47 is not engaged by sleeve 45. A second notch 52 serves to receive segment 51 in this position in which the sleeve is free to turn on shaft 46. Sleeve 38 may be shifted even beyond position IV into position V, in which the sector 51 engages a third notch 53 of spring 48. This notch is appreciably narrower than the other notches, so as to exercise a wedging action in relation to the segment 51, thereby holding the lever 38 against undesired peripheral movement. Hence, it will be clear, that by shifting sleeve 45 into either position III or one of the positions IV and V, the pilot may set the transmission selectively for common or separate control of the wings and the rotor blades. It will be noticed that the means, namely key 47, for coupling sleeve 45 to shaft 46, is so arranged that coupling can be accomplished in only one relative position of the lever 38 and stick 25. Thereby, it is insured that common control is possible only when also the wings and the control ring of the blades are in an originally predetermined relative position.

The new device operates in the following manner. With lever 38 in the position III, when stick 25 is in its middle position, control ring 19 is in a horizontal plane so that the rotor blades are adjusted for vertical lift or for hovering of the craft. Simultaneously, the wings 28 and 29 are in their position I in which they cause minimum drag to any vertical motion. This position of the wings is insured owing to the engagement of sleeve 45 with key 47 and the meshing of the gear wheels of the transmission 39 with drum 37 connected to drum 34 by means of cables 35 and 36. If now, stick 25 is moved forward the lower end of the stick will pull cable 27 thereby tilting the control ring 19 in Fig. 3 downward on the righthand side. In consequence the forward blade 18 will be turned about its longitudinal axis whereby the angle of incidence becomes a minimum in the illustrated position. The opposite blade 18' then will be in a position of maximum angle of incidence whereby the rotor will cause a power component to move the craft in a forward direction. Simultaneously with the tilting of the control ring 19, gear wheel 44 of transmission 39 will be taken along by key 47 on shaft 46 so as to turn shaft 42 by means of intermediate gear 43 and also the shaft 40 through the intermediary of the elliptical wheels 40 and 41 whereby the cable 35 will pull the wings 28 and 29 into a position such as indicated by dotted lines in Fig. 1. Provided the elliptical wheels 40 and 41 or equivalent cam device are correctly shaped, the change of position of the wings 28 and 29 from position I to II will occur rather rapidly upon a slight movement of stick 25, while upon further movement of the stick 25 the change of the angle of incidence of the wings will occur considerably more slowly. Owing to the forward motion of the shaft, the wings in a position such as II will create a lifting force in addition to the vertical component of the rotating blades. The advantage resulting from the wings according to my invention will be especially appreciable, if, as it happens frequently, the total rotor efficiency varies according to the inclination of the plane of rotation of the blades. As stated hereinbefore, the shape of the cam device may be so selected that for each position of the control ring 19 and corresponding adjustment of the rotor blades, the wings 28 and 29 are in a position in which they have the maximum of the desired effect.

If it is desirable to change the position of the wings independent from the adjustment of the blades, lever 38 may be pushed to the right in Fig. 4 until it engages either notch 52 or 53. In either one of these positions lever 38 may be then turned independent from stick 25 to adjust the wing position as desired. In order to recouple the parts it will first be necessary to bring the lever 38 and stick 25 into their original relative position in which key 47 is able to engage the sleeve 45.

Although I have shown only one embodiment of my invention, it will be understood that various changes and modifications thereof may be made without departing from the essence and spirit of my invention which is not limited by the particular disclosure of the specific form illustrated and described hereinabove but by the scope of the appended claim.

I claim:

In an aircraft the combination of a rotor with blades adapted to generate a thrust component in the direction of the normal axis of the craft, means under the control of the pilot for varying the plane of rotation of said blades with respect to the craft, wing-like members turnable about a transverse axis, second means under the control of the pilot for adjusting the angle of incidence of said wing-like members, and a disengageable coupling between said first and second means, said coupling being engageable only in a predetermined relative position of said first and second means.

ENEA WILBUR BOSSI.